US007424947B2

(12) United States Patent
Nakano

(10) Patent No.: US 7,424,947 B2
(45) Date of Patent: Sep. 16, 2008

(54) IMAGE FORMING APPARATUS

(75) Inventor: Hiroshi Nakano, Nagoya (JP)

(73) Assignee: Brother Kogyo Kabushiki Kaisha, Nagoya-shi, Aichi (JP)

(*) Notice: Subject to any disclaimer, the term of this patent is extended or adjusted under 35 U.S.C. 154(b) by 119 days.

(21) Appl. No.: 11/614,631

(22) Filed: Dec. 21, 2006

(65) Prior Publication Data

US 2007/0166072 A1 Jul. 19, 2007

(30) Foreign Application Priority Data

Dec. 26, 2005 (JP) ............................ 2005-372830

(51) Int. Cl.
*B65G 23/44* (2006.01)

(52) U.S. Cl. ........................ 198/814; 198/813; 399/165

(58) Field of Classification Search ............ 198/810.04, 198/813, 814, 815, 816; 399/110, 116, 165
See application file for complete search history.

(56) References Cited

U.S. PATENT DOCUMENTS 5,896,054 A * 4/1999 Gonzalez .................... 327/268
6,522,848 B2 2/2003 Wakana
6,958,452 B2 * 10/2005 Takahashi ................... 198/813
6,971,509 B2 * 12/2005 Ertel et al. .................. 198/813
7,347,318 B2 * 3/2008 Kato .......................... 198/814
2002/0021916 A1 2/2002 Wakana
2004/0118663 A1 * 6/2004 Gaeddert et al. ............ 198/813
2005/0145465 A1 * 7/2005 Ertel et al. .................. 198/813

FOREIGN PATENT DOCUMENTS

JP 08-015935 1/1996
JP 2001-209294 8/2001
JP 2002-060039 2/2002
JP 2002-062782 2/2002

* cited by examiner

*Primary Examiner*—James R Bidwell
(74) *Attorney, Agent, or Firm*—Banner & Witcoff, Ltd.

(57) ABSTRACT

An image forming apparatus includes a belt unit detachably installed in a main body, a first positioning mechanism provided in the main body to rotatably support a first support roller, a second positioning mechanism provided in the main body to rotatably support a second support roller, an urging mechanism that urges the second support roller in a direction to move the second support roller away from the first support roller, a reference protrusion provided in the belt unit in a predetermined positional relationship with the first support roller, and a reference wall disposed to face the reference protrusion in the main body at a position closer to the second support roller than the reference protrusion.

13 Claims, 7 Drawing Sheets

IMAGE FORMING APPARATUS

CROSS REFERENCE TO RELATED APPLICATION

This application claims priority from Japanese Patent Application No. 2005-372830 filed Dec. 26, 2005. The entire content of this priority application is incorporated herein by reference.

TECHNICAL FIELD

The disclosure relates to an image forming apparatus.

BACKGROUND

Generally an image forming apparatus such as a laser printer having its main body detachably provided with a belt unit has been put into practical use. For example, a main body of such image forming apparatus is provided with a support portion for supporting a support roller for the purpose of positioning. More specifically, the main body has a recess portion that accommodates the support roller for supporting the belt unit. A protrusion of the belt unit is inserted into the recess portion from one side so as to be attached as well as positioned. The aforementioned structure makes it possible to easily attach and detach the belt unit.

But, in the above-structured image forming apparatus, it is required to dispose the belt unit at the predetermined position in the main body at an appropriate tension with high accuracy for the purpose of stably performing the highly accurate paper feed and toner transfer, and thus it is not easy to use

SUMMARY

According to one configuration of the present invention, an image forming apparatus includes a belt unit including an belt, and a first and a second support roller for supporting the belt, which is detachably installed in a main body, a first positioning mechanism provided in the main body for rotatably supporting the first support roller, a second positioning mechanism provided in the main body for rotatably supporting the second support roller, an urging mechanism that urges the second support roller to be moved away from the first support roller, a reference protrusion provided in the belt unit having a predetermined positional relationship with the first support roller, and a reference wall that is provided in the main body at a position closer to the second support roller than the reference protrusion such that the reference wall faces the reference protrusion.

In this configuration, the second support roller is urged to apply the appropriate tension to the belt, and the reference protrusion is pressed against the reference wall to the degree according to the urging force. The belt unit thus may be positioned on the main body stably in the direction opposite to the first and the second support rollers.

BRIEF DESCRIPTION OF THE DRAWINGS

Illustrative aspects in accordance with the invention will be described in detail with reference to the following figures wherein.

DETAILED DESCRIPTION

Figure 1:
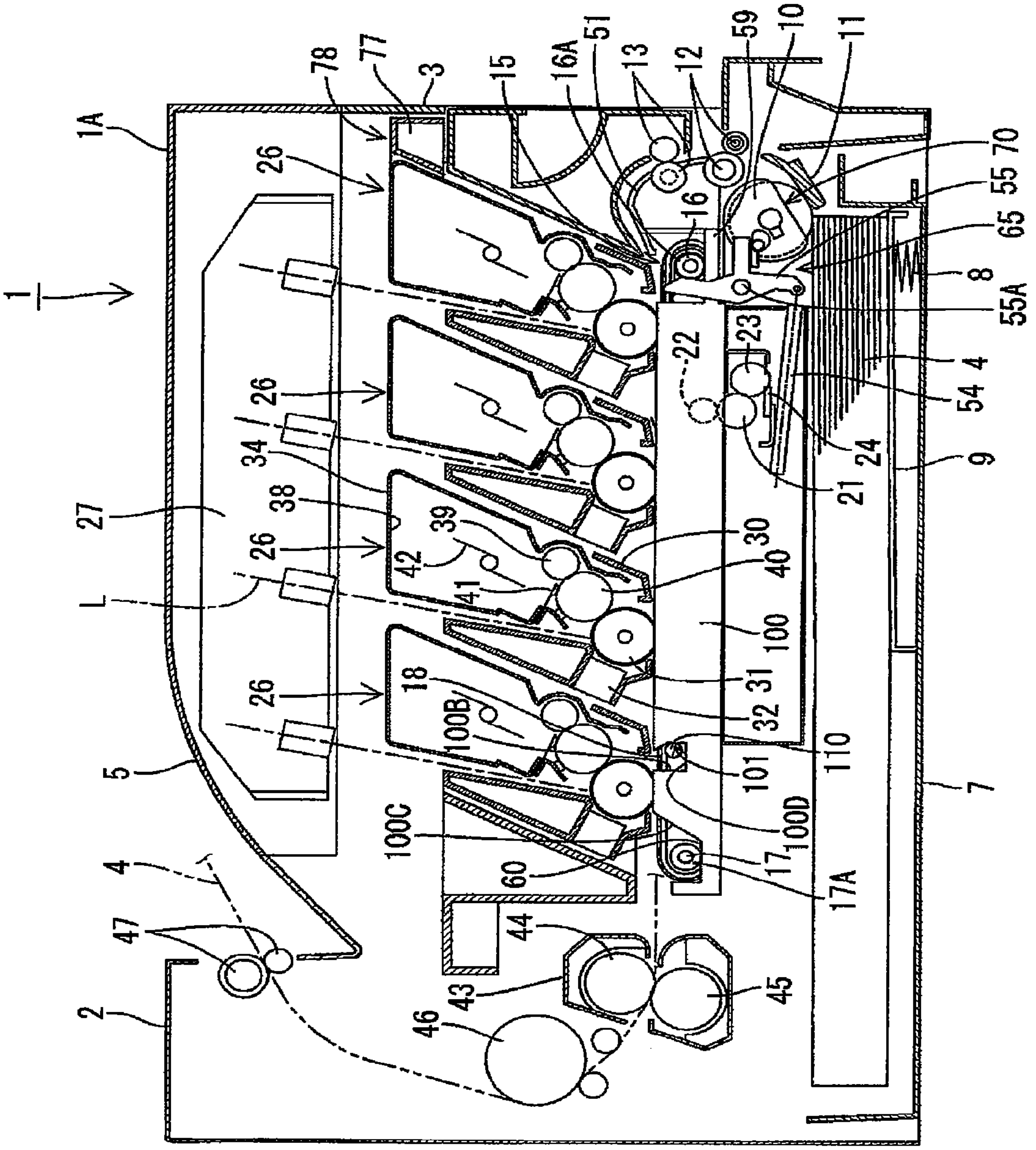
FIG. 1 is a sectional side elevation schematically showing a image forming apparatus according to one aspect of the invention.

One aspect of the invention will be described referring to the drawings.

1. Overall Structure of Image Forming Apparatus

Figure 2:
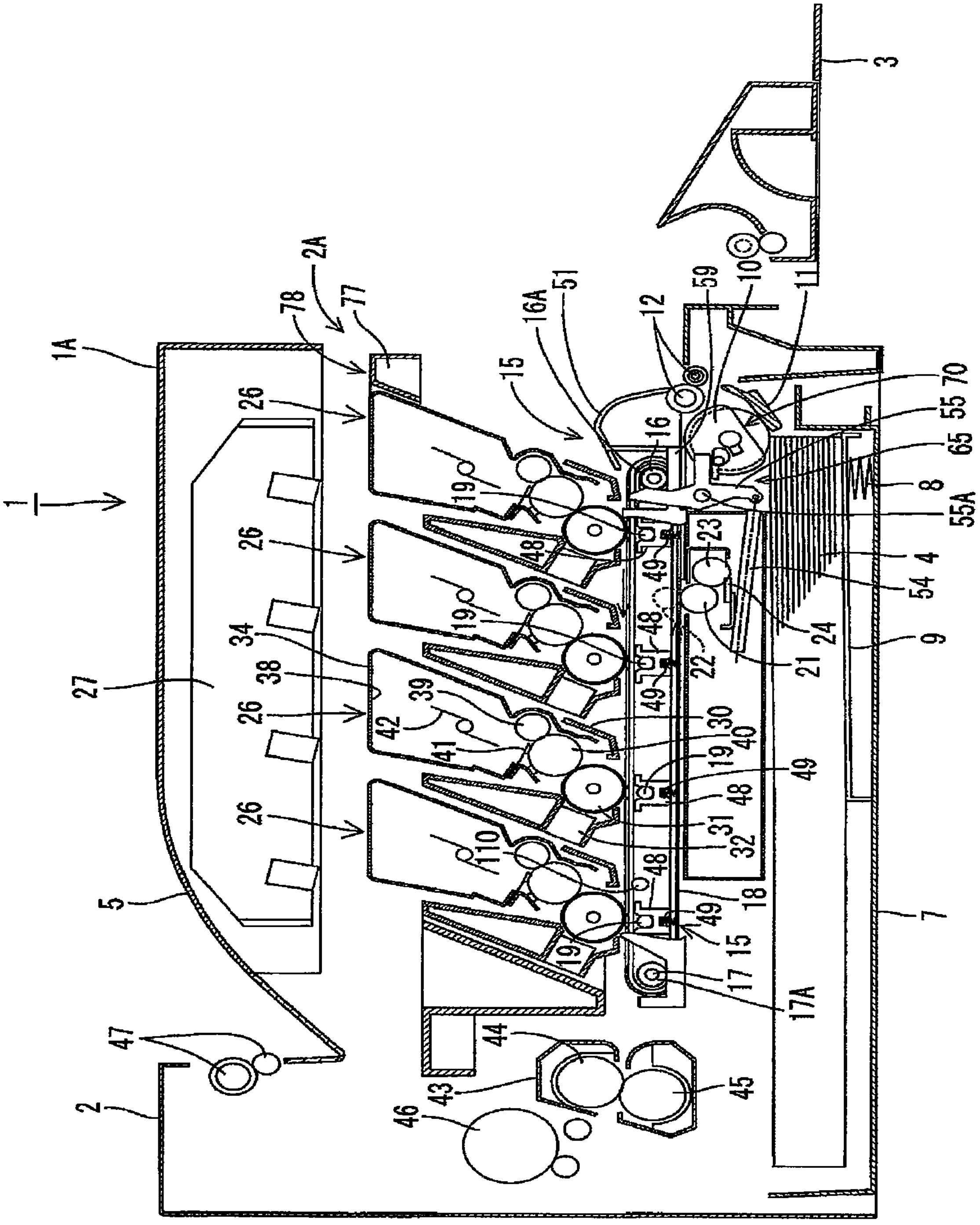
FIG. 2 is a sectional side elevation schematically showing a the image forming apparatus of FIG. 1 where a front cover is opened.

FIG. 1 is a sectional side elevation schematically showing an image forming apparatus according to an aspect of the invention. FIG. 2 is a sectional side elevation of the image forming apparatus 1 having its front cover 3 opened. In the further description, the right side of FIG. 1 will be hereinafter referred to as a front side.

The image forming apparatus 1 can be a color laser printer, or a direct transfer tandem type that includes a substantially box-like body casing 2 as shown in FIG. 1. The front cover 3 that can be opened and closed is attached to a front surface of the body casing 2. A process cartridge 26 or a belt unit 15 within the body casing 2 may be replaced by opening the front cover 3. A catch tray 5 on which sheets of paper 4 that have been subjected to the image forming process are stacked is formed on the upper surface of the body casing 2.

A feed tray 7 on which the sheets of recording medium 4 subjected to the image forming process are stacked is set so as to be withdrawn forward. A platen 9 that is tiltably operated by the urging force of a spring 8 so as to lift up the front edge of the recording medium 4 is provided within the feed tray 7. A pick-up roller 10 and a separator pad 11 in pressure contact therewith due to the urging force of a spring (not shown) are provided above the front end of the feed tray 7. A pair of feed rollers 12 are provided diagonally forward above the pick-up roller 10, and a pair of registration rollers 13 are further provided above the pair of feed rollers 12.

The upper most recording medium 4 among those stacked on the feed tray 7 is pressed toward the pick-up roller 10 by the platen 9. As the pick-up roller 10 rotates, the recording medium 4 is sandwiched between the pick-up roller 10 and the separator pad 11 so as to be separated and fed one by one. The recording medium 4 that has been fed from between the pick-up roller 10 and the separator pad 11 is further carried to the registration rollers 13 by the feed rollers 12 while making a U-shaped turn from the front to the rear direction. The recording medium 4 is fed by the registration rollers 13 to the belt unit 15 backward thereof at a predetermined timing.

The belt unit 15 is structured to be detachable with respect to the body casing 2, and provided with a carrier belt 18 that horizontally extends between a pair of support rollers 16 at a front position and 17 at a rear position which are apart from each other. The rear support roller 17 of the pair of support rollers 16 and 17 is a drive roller that is driven to be rotated by power of a motor (not shown), and the front support roller 16 is a tension roller for applying a tensile force to the carrier belt 18. The support roller (drive roller) 17 can be formed by applying a rubber layer or a coating layer to the surface of a substantially cylindrical metal pipe made of aluminum or stainless steel for the purpose of improving the gripping force between the roller and the inner surface of the belt. The support roller (tension roller) 16 can be formed by plating the surface of a substantially cylindrical metal pipe made of aluminum or stainless steel for the purpose of preventing abrasion due to friction against the inner surface of the belt.

The carrier belt 18 can be formed of a resin material such as polycarbonate and the like serving as a transfer belt. It is operated to circulate counterclockwise (as shown in FIG. 1) when the support roller 17 as the drive roller is driven to be rotated such that the recording medium 4 set on the carrier belt 18 is carried backward. As shown in FIG.2, transfer rollers 19 are positioned inside the carrier belt 18 at constant intervals such that they face photosensitive drums 31 in the respective process cartridges 26 (which will be described later). The carrier belt 18 is, thus, interposed between the respective photosensitive drums 31 and the corresponding transfer rollers 19. The transfer roller 19 can be formed by applying a roller formed of a conductive rubber material to a metal roller shaft. During the transfer process, the transfer bias is applied between the transfer rollers 19 and the photosensitive drums 31, respectively. The structure of the belt unit 15 will be described later.

A cleaning roller 21 is provided below the belt unit 15 for removing toner or paper dust adhered to the carrier belt 18. The cleaning roller 21 can be formed by providing a foaming material including silicon around a metal shaft member. The cleaning roller 21 faces a metal back-up roller 22 provided in the belt unit 15 such that the carrier belt 18 is interposed there between. A predetermined bias voltage is applied between the cleaning roller 21 and the back-up roller 22 such that the toner or the like on the carrier belt 18 may be removed by the cleaning roller 21, and electrically drawn to the. The cleaning roller 21 abuts against a metal recovery roller 23 for removing the toner or the like adhered to the surface of the cleaning roller 21. The recovery roller 23 further abuts against a blade 24 that scratches or removes the toner or the like adhered to the surface of the recovery roller 23.

Process cartridges 26 corresponding to such colors as magenta, yellow, cyan and black, respectively are detachably arranged in the longitudinal direction above the belt unit 15. A scanner portion 27 is provided above those process cartridges. The scanner portion 27 irradiates a laser beam L of multiple colors onto a surface of the corresponding photosensitive drum 31 on the basis of the predetermined image data through rapid scanning.

The process cartridge 26 can include a cartridge frame 30, the photosensitive drum 31 and a electrifier 32 (i.e. scorotron type) each provided at the lower portion of the cartridge frame 30, and a development cartridge 34 detachably set to the cartridge frame 30. The respective process cartridges 26 have the same structures except colors of the contained toners. In the drawing like FIG. 1, only the second cartridge from the left is designated with the reference numeral, and the reference numerals for the rest of those cartridges, thus will be omitted.

The photosensitive drum 31 includes a metal drum body that is grounded and the surface of which is coated with a positively charged photosensitive layer formed of a polycarbonate or the like.

The electrifier 32 is provided diagonally backward above the photosensitive drum 31 such that they face each other with a predetermined clearance therebetween so as not to contact with each other. The electrifier 32 a wire for charging to generate a corona discharge so that the entire surface of the photosensitive drum 31 is positively charged uniformly.

The development cartridge 34 includes a toner storage chamber 38 at the upper portion, a supply roller 39, a development roller 40, and a layer thickness restriction blade 41 at the lower portion. Each of the toner storage chambers 38 stores nonmagnetic single component toner that has been positively charged as the development agent for a plurality of colors (such as yellow, magenta, cyan, and black). Each toner storage chamber 38 is provided with an agitator 42 that agitates the toner.

The supply roller 39 can be formed by a metal roller shaft coated with a conductive foaming material. The development roller 40 can be formed by a metal roller shaft coated with a conductive rubber material. The toner discharged from the toner storage chamber 38 is supplied to the development roller 40 accompanied with the rotation of the supply roller 39, and is positively friction charged between the supply roller 39 and the development roller 40. The toner supplied onto the development roller 40 proceeds between the layer thickness restriction blade 41 and the development roller 40 accompanied with the rotation of the development roller 40 and is further friction charged sufficiently so as to be carried on the development roller 40 to form a thin layer with a uniform thickness.

The surface of the photosensitive drum 31 during rotation is uniformly positive charged by the electrifier 32. Thereafter, it is exposed to rapid scanning of the laser beam from the scanner portion 27 such that the electrostatic latent image corresponding to the image to be formed on the recording medium 4 is generated.

Upon rotation of the development roller 40, the positively charged toner carried thereon is caused to face and be in contact with the photosensitive drum 31, such that the toner is supplied to the electrostatic latent image generated on the surface of the photosensitive drum 31. Accordingly, the electrostatic latent image on the photosensitive drum 31 may be visualized, that is, the toner image is carried on the surface of the photosensitive drum 31 resulting from the reversal phenomenon.

The toner image carried on the surface of the respective photosensitive drums 31 is sequentially transferred on the recording medium 4 under the negative transfer bias voltage applied to the transfer rollers 19 while the recording medium 4, carried by the carrier belt 18, is fed through the respective transfer positions between the photosensitive drums 31 and the transfer rollers 19. The recording medium 4, on which the toner image has been transferred, is fed to a fixation unit 43.

The fixation unit 43 is disposed to the rear of the carrier belt 18 within the body casing 2. The fixation unit 43 is provided with a heating roller 44 and a press roller 45. The heating roller 44 includes a heat source such as a halogen lamp or the like, that is driven to be rotated. The press roller 45 is disposed below the heating roller 44 such that it faces and presses the heating roller 44 and is driven through rotation. The fixation unit 43 heats the recording medium 4 that carries the four colored toner image while being gripped and carried between the heating roller 44 and the press roller 45 so as to fix the toner image on the recording medium 4. The thermally fixed recording medium 4 is carried to discharge rollers 47 at the upper portion of the body casing 2 by a carrier roller 46 diagonally backward above the fixation unit 43. The recording medium 4 is then discharged onto the catch tray 5 by the discharge rollers 47.

2. Belt Unit and Peripheral Structure

The belt unit and peripheral structure thereof will be described in detail.

(Belt Unit)

Figure 3:
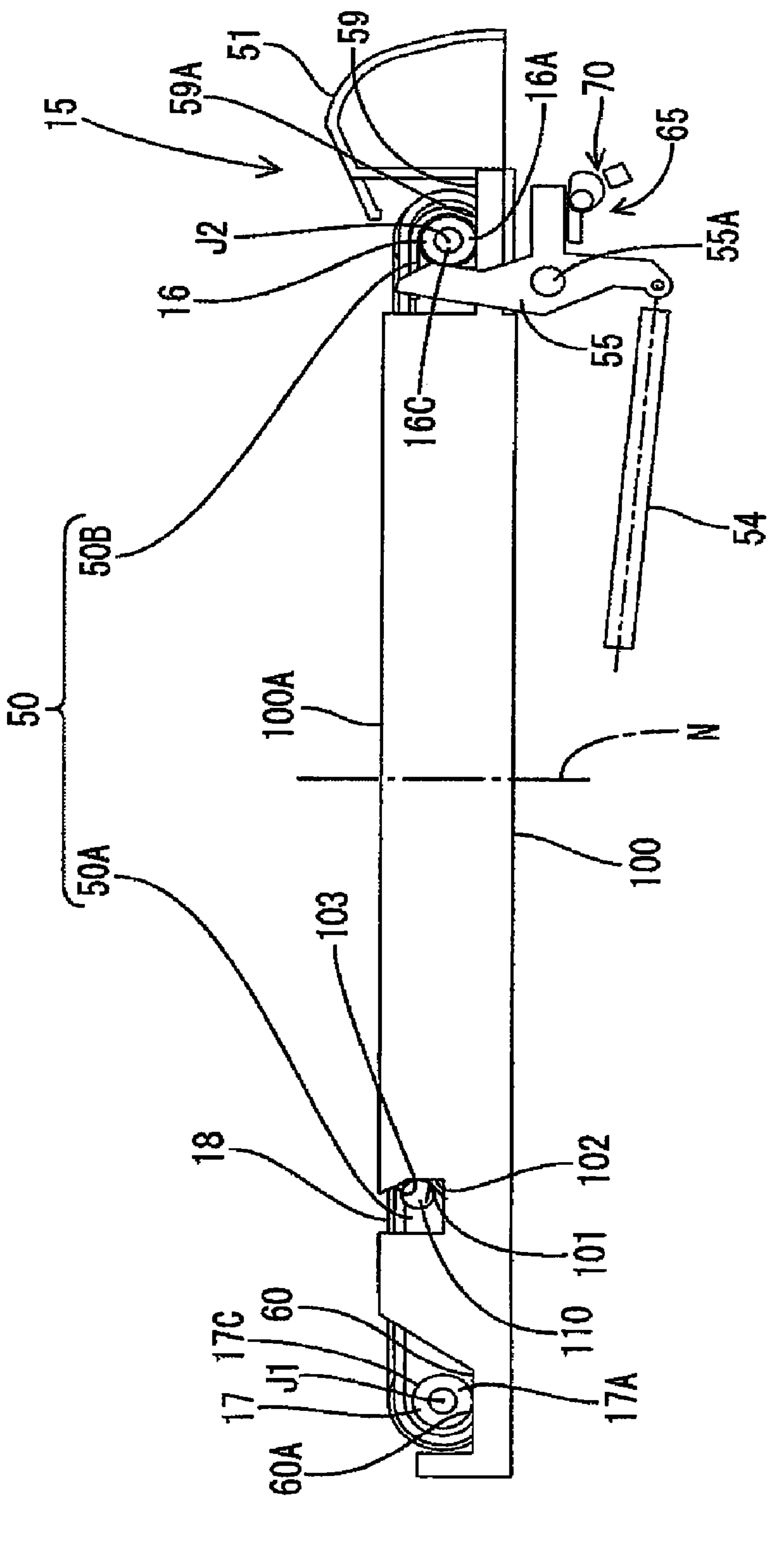
FIG. 3 is an explanatory view showing a belt unit and its peripheral portion.
Figure 4:
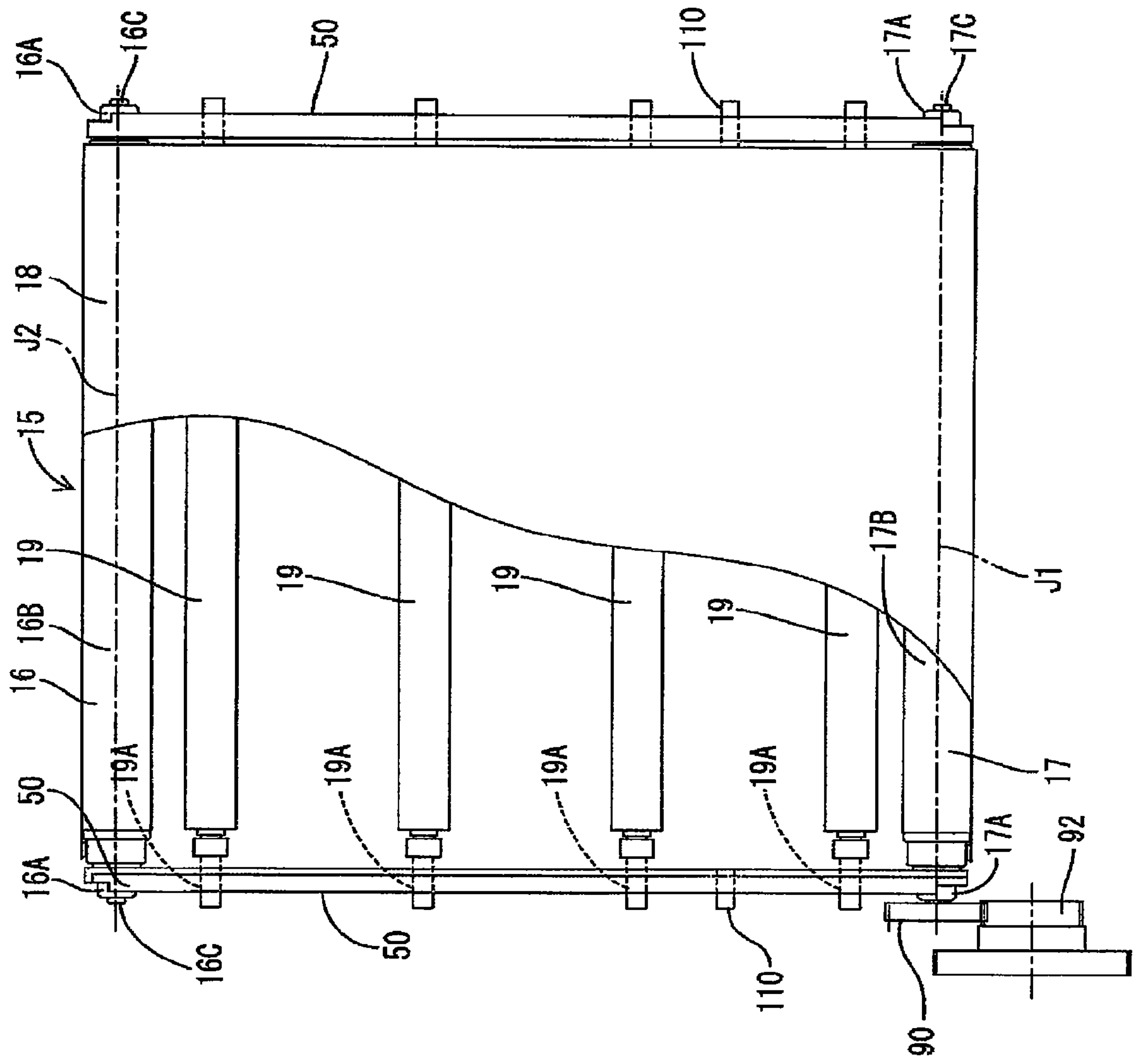
FIG. 4 is an explanatory view showing an inner structure of the belt unit.
Figure 5:
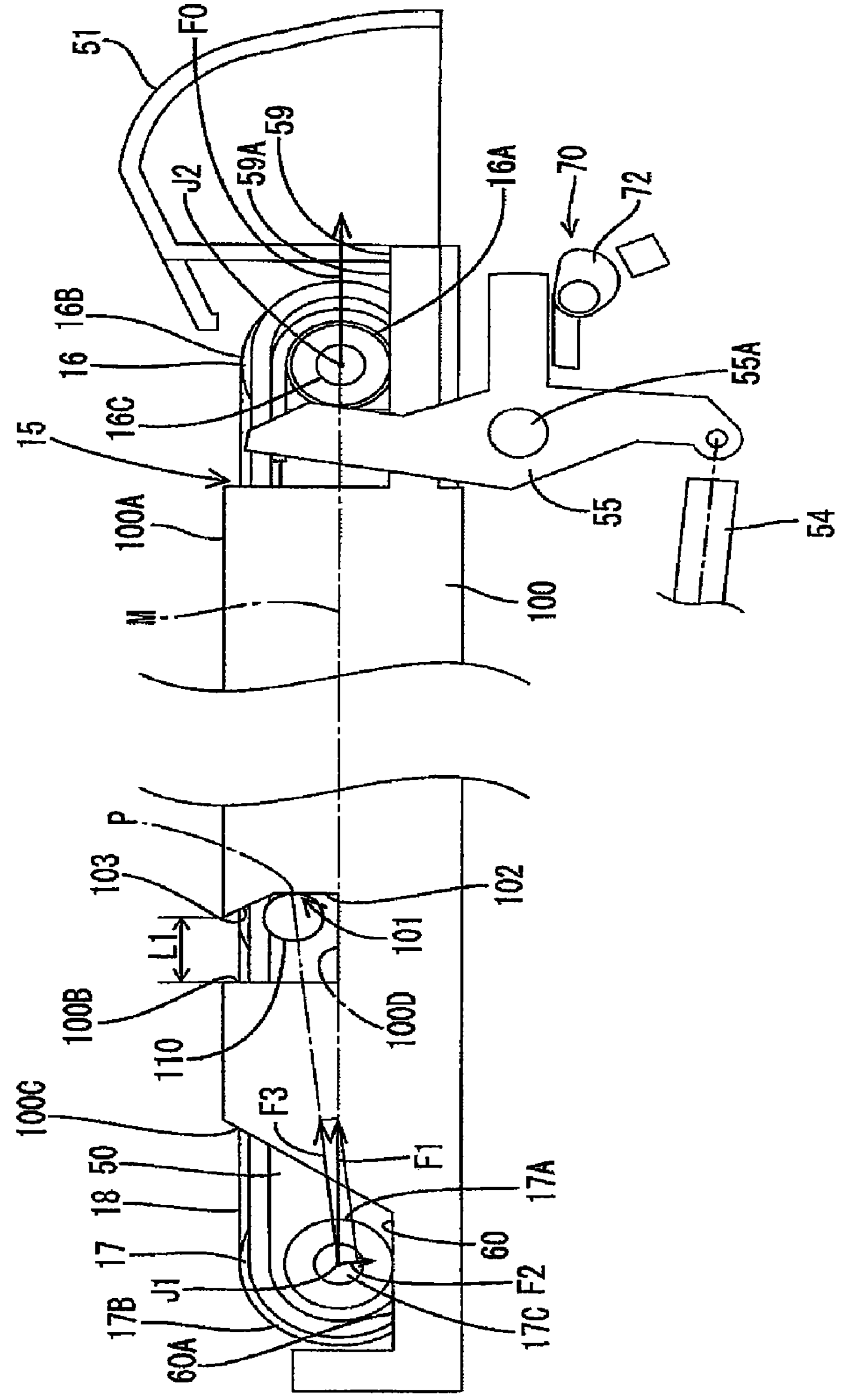
FIG. 5 is an explanatory view showing how the belt unit is positioned.

FIG. 3 is a sectional side elevation of the belt unit and its peripheral parts that are viewed from the side. FIG. 4 is a view of the belt unit seen from the top, which conceptually shows its inner structure. FIG. 5 is an enlarged view of a portion of the belt unit shown in FIG. 3. A guide member 51 is not shown in FIG. 4. An intermediate portion of the belt unit is partially omitted in FIG. 5.

Referring to FIGS. 3 and 4, in the belt unit 15, the support roller 17 is rotatably supported at a rear end of a belt frame 50 having opposite left and right side walls (FIG. 1 only shows the left side wall when the laser printer 1 is seen from the front) via a bearing portion 17A that supports a roller shaft 17C of the support roller 17. Meanwhile, the support roller 16 is rotatably supported at a front end of the belt frame 50 via a bearing portion 16A that supports a roller shaft 16C. The bearing portion 17A is allowed to be operated in association with a roller portion 17B of the support roller 17 in the direction intersecting with the rotating axis of the support roller 17. As the bearing portion 17A relatively moves in the direction away from the support roller 16, the roller portion 17B of the support roller 17 is moved away from a roller portion 16B of the support roller 16 such that the tension is applied to the carrier belt 18. The mechanism for applying the tension will be described in detail later.

Figure 7:
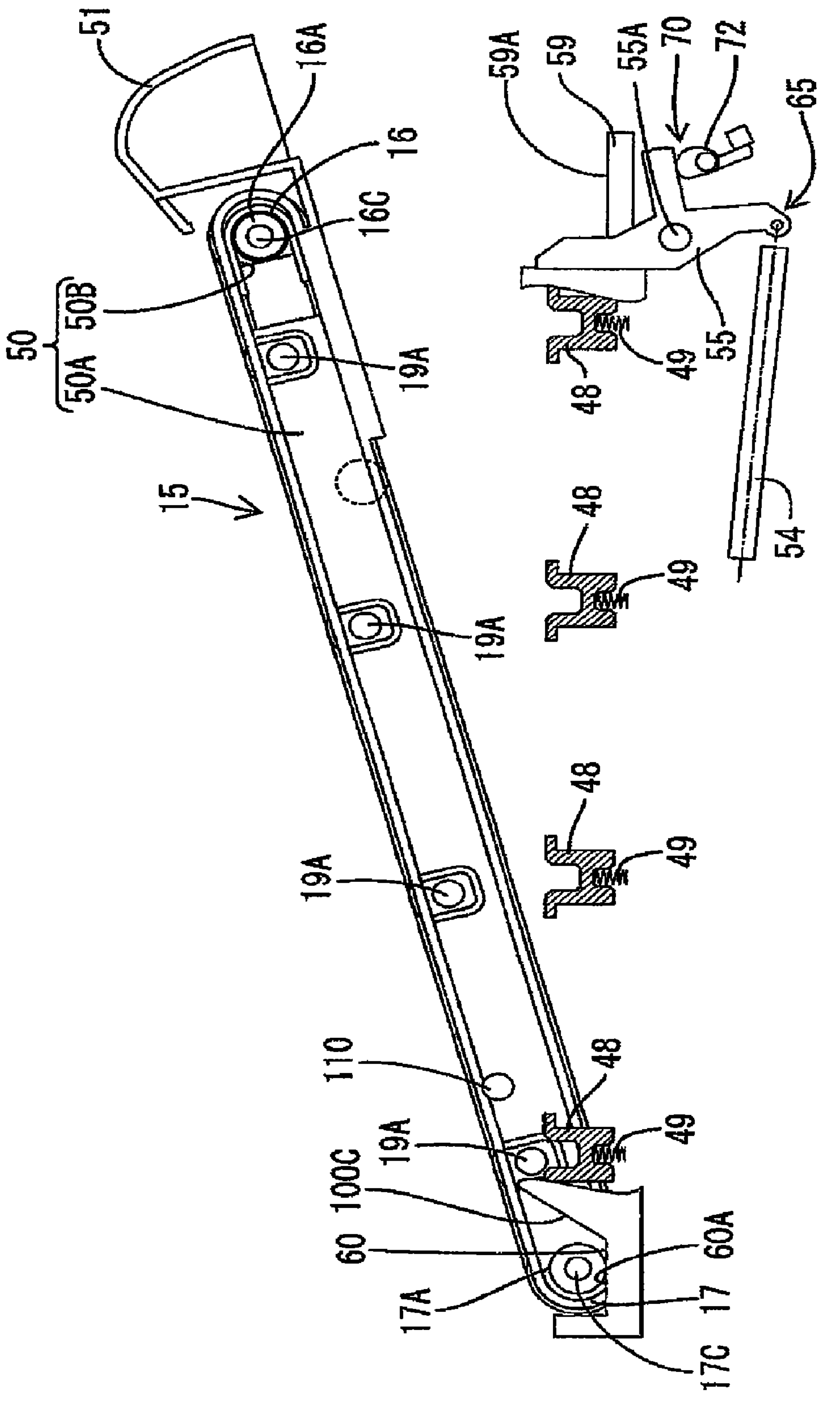
FIG. 7 is an explanatory view showing detachment of the belt unit.

The belt frame 50 includes a frame body 50A that bears the support roller 17 at the rear end, and a slide bearing member 50B that is provided at the front end to be slidable back and forth with respect to the frame body 50A (see FIG. 7). The slide bearing member 50B bears the support roller 16 so as to make a relative movement back and forth with respect to the support roller 17 at the rear end. The circular carrier belt 18 is set between the pair of those support rollers 16 and 17.

Referring to FIG. 4, the aforementioned transfer rollers 19 are aligned at approximately equal intervals in the longitudinal direction between the left and right side walls of the belt frame 50. Each end of roller shafts 19A of the respective transfer rollers 19 is inserted into a vertically long through hole formed in the left and right side walls to protrude outside while being rotatably supported. Each of the respective protruding ends is fit with the body casing 2 while being born by the transfer roller bearing member 48 within the body casing 2, as shown in FIG. 2. Each of the transfer roller bearing members 48 is urged upward by a spring 49. This may allow the transfer roller 19 to press the corresponding photosensitive drum 31 with the carrier belt 18 interposed therebetween.

Referring to FIGS. 1 and 2, the belt unit 15 installed in the body casing 2 rotatably supports the back-up roller 22 that is pressed by the cleaning roller 21 via the carrier belt 18 there between. Referring to FIGS. 1 to 3, the guide member 51 is integrally provided to the belt frame 50 at the front end thereof, that forms a carrier path for a U-shaped turn of the recording medium 4 from the paper feed tray 7. The belt unit 15 may be removed from the body casing 2 by manually withdrawing the guide member 51 (see FIG. 8).

(Mechanism for Applying Tension Force)

As described above, the laser printer 1 includes the belt unit 15 having the carrier belt 18 as the endless belt, and the support roller 16 (as the second support roller) and the support roller 17 (as the first support roller) for supporting the carrier belt 18. The belt unit 15 is detachably installed in the main body 1A that includes the body casing 2. The main body 1A includes a frame 100 provided with a unit support portion 60 (as the first positioning unit) that rotatably supports the support roller 17 upon installation, and a unit support portion 59 (as the second positioning unit) that rotatably supports the support roller 16. In the belt unit 15, the unit support portion 59 supports a pair of left and right bearing portions 16A each supporting the respective left and right ends of the roller shaft 16C of the support roller 16 protruding from the belt frame 50. The unit support portion 60 supports a pair of bearings 17A, the bearings 17A each supporting the respective left and right ends of the roller shaft 17C of the support roller 17 protruding from the belt frame 50.

In the body casing 2, a tension application mechanism 65 having a coil spring 54 is disposed at the front end of the belt unit 15. More specifically, the tension application mechanism 65 is provided with a pair of levers 55, 55 each having a center rotatably supported at a rotary shaft 55A extending in the lateral direction, and a pair of coil springs 54, 54 each urging the corresponding lever 55. FIG. 1 only shows the left portion of the laser printer 1 when seen from the front.

Each rear end of the coil springs 54 is fixed to the body casing 2, and each front end, that is a free end, is connected to each lower end portion of the levers 55. The levers 55 are capable of swinging against the elastic force of the coil spring 54. Two pairs of the levers 55 and the coil springs 54 are arranged to sandwich the front end of the disposed belt unit 15.

Referring to FIGS. 1, 3, and 5, upon installation of the belt unit 15, the bearing portion 17A is placed on the unit support portion 60, and the bearing portion 16A is disposed on the unit support portion 59, respectively. The lever 55 abuts against the back surface of the bearing portion 16A such that the coil spring 54 is elastically deformed to extend. The restoring force of the coil spring 54 urges the bearing portion 16A in the direction away from the support roller 17 (forward direction). Specifically, the tension application mechanism 65 urges the support roller 16 in the direction away from the support roller 17. The tension application mechanism 65 corresponds to the urging unit.

Meanwhile, as shown in FIGS. 3 to 5, the belt unit 15 is provided with a reference protrusion 110 having a predetermined positional relationship with the support roller 17. The reference protrusion 110 may be fixed to the both belt frames 50, or may be integrally formed with the belt frame 50.

A reference wall 101 that faces the reference protrusion 110 is provided at the position closer to the support roller 16 than the reference protrusion 110. The reference protrusion 110 and the reference wall 101 abut with each other when one end of the belt unit 15 is urged forward by the tension application mechanism 65. Accordingly, the belt unit 15 as a whole may be correctly positioned in the longitudinal direction.

As described above, the reference protrusion 110 is provided on the belt frame 50 (as the frame portion) that rotatably holds the support roller 17 of the belt unit 15. Referring to FIG. 5, the unit support portion 60 includes a first roller support plane 60A substantially in parallel to a virtual plane M formed by connecting a first rotating axis J1 of the support roller 17 and the second rotating axis J2 of the support roller 16. The unit support portion 59 includes a second roller support plane 59A substantially parallel to the virtual plane M. The support roller 16 is allowed to make a relative displacement with respect to the belt frame 50, and is moveable along the second roller support plane 59A under the urging force applied by the tension application mechanism 65.

The reference protrusion 110 is disposed at the position opposite the side at which the unit support portion 60 is disposed with respect to the virtual plane M at a predetermined interval therefrom. In response to application of the urging force to the support roller 16 by the tension application mechanism 65, the support roller 17 is moved toward the support roller 16 via the carrier belt 18, and at the same time, the reference protrusion 110 is pressed against the reference wall 101.

In accordance with the force that moves the support roller 17 toward the support roller 16, the moment around position P, at which the reference protrusion 110 abuts against the reference wall 101 (that is, the contact between the reference protrusion 110 and the reference wall 101), is generated in the support roller 17 so as to be pressed by the unit support portion 60. More specifically, the urging force applied by the tension application mechanism 65 generates the force in the direction (see arrow F0) along the roller support plane 59A of the support roller 16. Then in accordance with the force of the support roller 16, the support roller 17 is moved toward the support roller 16 via the carrier belt 18. Accordingly, the force for directing the support roller 17 toward the support roller 16 is generated (see arrow F1).

The force in the same direction as that shown by arrow F1 is generated in the belt frame 50 that supports the support roller 17. The reference protrusion 110 integrally formed with the belt frame 50 is pressed against the reference wall 101. Meanwhile, as the reference protrusion 110 is supported by the reference wall 101, component force F3 directed to the abutment position P and component force F2 orthogonal to the component force F3 are generated based on the force F1. The moment around the abutment position P generated by the component force F2 presses the support roller 17 against the unit support portion 60.

Referring to FIG. 3, the reference protrusion 110 is positioned closer to the support roller 17 than the intermediate position (alternate long and short dash line N) between the support rollers 17 and 16. Accordingly, the moment generated around the support roller 17 becomes larger such that the support roller 17 may further be effectively pressed against the unit support portion 60. As shown in FIGS. 3 and 5, the reference protrusion 110 does not abut against a bottom portion 100D of a groove portion 100B. That is, the space is formed below the reference protrusion 110 (at the side of virtual plane M) for moving the reference protrusion 110. Specifically, unlike the structure having the reference protrusion 110 abutted against the bottom portion 100D, in the structure of the example, the force that drives the support roller 17 downward is not reduced.

In the structure according to the example, the support rollers 16 and 17 may be positioned based on the first and the second roller support planes 60A and 59A. This makes it possible to prevent those rollers from displacing in the direction intersecting with the roller support planes 60A and 59A. The belt is caused to generate the tension force due to the urging force along the second roller support plane 59A. Meanwhile, such urging force forces the support roller 17 toward the unit support portion 60. This makes it possible to stably press the support roller 17 against the unit support portion 60. The positioning of the support roller 17 in the direction orthogonal to the first roller support plane 60A may be performed with high precision.

The support roller 16 is moveable along the second roller support plane 59A formed on the unit support portion 59. The reference wall 101 includes an orthogonal support plane 102 that is substantially orthogonal to the moving direction of the support roller 16. The reference protrusion 110 is positioned with respect to the moving direction by the abutment of the orthogonal support plane 102 against the reference protrusion 110. That is, the reference protrusion 110 may be further stably positioned with respect to the moving direction of the support roller 16 (that is, the direction parallel to the second roller support plane 59A). Further, by providing the orthogonal support plane 102 as described above, it is possible to surpress excessive force from being generated in the reference protrusion 110 in the direction orthogonal to the moving direction of the support roller 16 (direction parallel to the orthogonal support plane 102). This can prevent the belt frame from being excessively warped.

The reference wall 101 has an inclined surface 103 continued to the orthogonal support plane 102 apart from the virtual plane M formed by connecting the first rotating axis J1 of the support roller 17 and the second rotating axis J2 of the support roller 16 farther than the orthogonal support plane 102. The inclined surface 103 is set such that the angle formed with the plane in parallel to the second roller support plane 59A is smaller than 90°. The angle formed by the inclined surface 103 and the virtual plane M is also smaller than 90°.

In the aforementioned structure, if the reference protrusion 110 is lifted to the level above the predetermined position with respect to the main body 1A, the urging force applied by the tension application mechanism 65, and abutment of the inclined surface 103 against the reference protrusion 110 generate the pressing force that presses the reference protrusion 110 downward. This makes it possible to effectively prevent the belt unit 15 from lifting. Meanwhile, as shown in FIG. 5, if the reference protrusion 110 is not lifted significantly, the reference protrusion 110 abuts against the orthogonal support plane 102 so as to be stably positioned. In the above structure, the force is generated to suppress lifting of the reference protrusion 110, only when the lifting occurs. In other words, the excessive force is unlikely to be generated when the lifting does not occur, thus effectively preventing a warp in the frame and the like.

3. Attachment/Detachment of Belt Unit

The operation for attaching/detaching of the belt unit 15 will be described.

Figure 6:
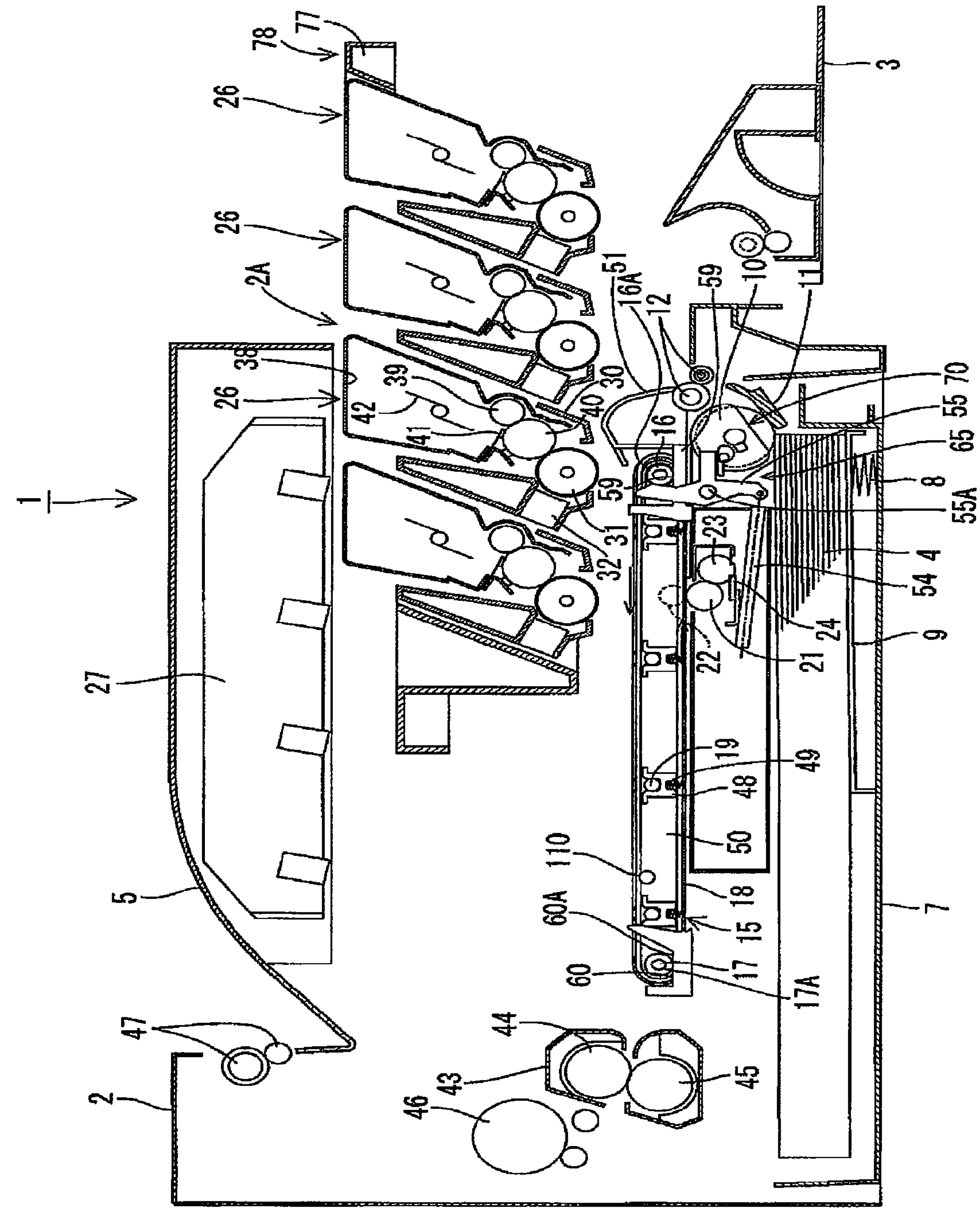
FIG. 6 is a sectional side elevation schematically showing a state where the image forming unit is detached from the body casing.

In the structure according to this example, a frame 77 having process cartridges 26 is provided within the body casing 2. Referring to FIG. 6, an image forming unit 78 including the frame 77 and the process cartridges 26 may be removed from an opening 2A formed in the body casing 2. In order to remove the carrier belt 18, the front cover 3 is opened as shown in FIG. 2, and the image forming unit 78 is withdrawn as shown in FIG. 6 so that the belt unit 15 can be accessed via the opening 2A.

In the aforementioned structure, the guide member 51 combined with the belt unit 15 is disposed at the position closer to the opening 2A than the carrier belt 18. Withdrawal of the image forming unit 78 allows easy access to the guide member 51 via the opening 2A.

Referring to FIG. 7, when the belt unit 15 is rotated by operating the guide member 51 around the support roller 17 (specifically, the bearing portion 17A of the support roller 17), the support roller 16 moves away from the unit support portion 59, and the reference protrusion 110 passes through the groove 100B. When the belt unit 15 is withdrawn in the aforementioned state, the bearing portion 17A moves along an inclined surface 100C of the frame 100 which combines the unit support portions 59 and 60. When the belt unit 15 is further withdrawn forward in the state where the bearing portion 17A is mounted on an upper end surface 100A (see FIG. 1), the belt unit 15 is completely removed from the installed position. Note that, in the example, an opening width L1 of the groove portion 100B is smaller than the diameter of the bearing portion 17A, as shown in FIG. 5. Even if the bearing portion 17A is slid along the upper end surface 100A, it is not inserted into the groove portion 100B.

Meanwhile, the belt unit 15 is installed in the body casing 2 in the following manner. The belt unit is inserted into the opening 2A, the bearing portions 17A at both ends of the rear support roller 17 are slid backward while being mounted on the upper end surface 100A of the frame 100 so as to support the bearing portion 17A at the unit support portions 60. At the same time, the bearing portions 16A at both ends of the front support roller 16 are mounted on the unit support portion 59. In this way, the urging force of the coil spring 54 presses the bearing portion 16A such that the lever 55 is brought into the tension state that applies the tension force to the carrier belt 18. The belt unit 15, thus, is stably positioned with respect to the body casing 2.

The structure of this example is further provided with a tension release mechanism 70. In the tension release mechanism 70, a cam 72 is structured to take first and second displacements. The tension state may be switched between the tension applied state and the tension released state in accordance with the displacement of the cam 72. When the belt unit 15 is removed, the tension release mechanism 70 is brought into the tension release state (see FIG. 7) to allow easy detachment of the bearing portion 16A. On the other hand, when the belt unit 15 is attached, the tension release mechanism 70 is brought into the tension applied state (see FIG. 3) to allow the bearing portions 16A to be stably urged. Note that the cam 72 may be structured to be manually displaced, or electrically displaced, for example, by using an actuator as a stepping motor. Alternatively, the aforementioned tension release mechanism 70 may be omitted. In this case, when the belt unit 15 is removed from the installed position shown in FIG. 3, the lever 55 maybe formed to incline slightly forward of the belt unit 15. Meanwhile, when the belt unit 15 is attached, the inclined lever 55 is turned rearward against the urging force such that the bearing portions 16A are pressed in for installation.

The invention is not limited to the example that has been described above referring to the drawings, and other examples as described below may be within the scope of the invention.

(1) The roller that supports the belt can include at least the first and the second support rollers. Alternatively, a third support roller in addition to the aforementioned support rollers may also be provided.

(2) The invention can be applied to the image forming apparatus of intermediate transfer type for transferring the developer image from the photoreceptor to the intermediate transfer belt. In this case, the invention may be applied by regarding the intermediate transfer belt as the belt in the scope of the invention.

What is claimed is:

1. An image forming apparatus comprising:

a main body; and a belt unit detachably installed in the main body;

wherein the belt unit comprises:

a belt;

a first support roller for supporting said belt;

a second support roller for supporting said belt;

a reference protrusion having a predetermined positional relationship with said first support roller;

wherein the main body comprises:

a first positioning mechanism for rotatably supporting said first support roller;

a second positioning mechanism for rotatably supporting said second support roller;

an urging mechanism that urges said second support roller to be moved away from said first support roller; and a reference wall at a position closer to said second support roller than said reference protrusion such that said reference wall faces said reference protrusion.

2. The image forming apparatus according claim 1, wherein:

said first support roller rotates around a first rotating axis, and said second support roller rotates around a second rotating axis; and a position at which said reference protrusion abuts against said reference wall is disposed apart from a virtual plane by a predetermined distance on the opposite side to a side where said first positioning mechanism is provided, said virtual plane being formed by connecting said first rotating axis of said first support roller and said second axis of said second support roller.

3. The image forming apparatus according to claim 2, wherein said reference protrusion is provided at a position closer to said first support roller than an intermediate position between said first and said second support rollers.

4. The image forming apparatus according to claim 3, wherein:

said second support roller is moveable along a second roller support plane formed on said second positioning mechanism; and said reference wall includes an orthogonal support plane that is substantially orthogonal to a moving direction of said second support roller, and said reference protrusion is positioned with respect to said moving direction by abutment of said orthogonal support plane against said reference protrusion.

5. The image forming apparatus according to claim 4, wherein:

said reference wall includes an inclined surface continued to said orthogonal support plane at a position apart from a virtual plane that is formed by connecting said first rotating axis of said first support roller and said second rotating axis of said second support roller farther than said orthogonal support plane; and said inclined surface is formed to be at an angle below 90° with respect to a plane parallel to said second roller support plane.

6. The image forming apparatus according to claim 2, wherein:

said reference protrusion is formed on a frame portion that rotatably holds said first support roller provided in said belt unit;

said first positioning mechanism includes a first roller support plane structured substantially parallel to said virtual plane;

said second positioning mechanism includes a second roller support plane substantially parallel to said virtual plane;

said second support roller is capable of being displaced relative to said frame portion, and moveable along said second roller support plane by an urging force applied by said urging mechanism;

said first support roller is moved toward said second support roller via said belt as said second support roller is urged by said urging mechanism, and said reference protrusion is pressed against said reference wall; and a moment around a position at which said reference protrusion abuts against said reference wall is generated in said first support roller in accordance with a force that drives said first support roller to move toward said second support roller, and said first support roller is pressed against said first positioning mechanism.

7. The image forming apparatus according to claim 6, wherein said reference protrusion is provided at a position closer to said first support roller than an intermediate position between said first and second support rollers.

8. The image forming apparatus according to claim 7, wherein:

said second support roller is moveable along a second roller support plane formed on said second positioning mechanism; and said reference wall includes an orthogonal support plane that is substantially orthogonal to a moving direction of said second support roller, and said reference protrusion is positioned with respect to said moving direction by abutment of said orthogonal support plane against said reference protrusion.

9. The image forming apparatus according to claim 8, wherein: said reference wall includes an inclined surface continued to said orthogonal support plane at a position apart from a virtual plane formed by connecting said first rotating axis of said first support roller and said second rotating axis of said second support roller farther than said orthogonal support plane; and said inclined surface is formed so as to be at an angle below 90° with respect to a plane parallel to said second roller support plane.

10. An image forming apparatus comprising:

a main body; and a belt unit which is detachably installed in the main body;

wherein the belt unit comprises:

a belt, a first support roller for supporting the belt, the first support roller is capable of rotating around a first rotating axis;

a second support roller for supporting the belt, the second support roller is capable of rotating around a second rotating axis; and a reference protrusion having a predetermined positional relationship with said first support roller; and wherein the main body comprises:

a first positioning mechanism for rotatably supporting said first support roller;

a second positioning mechanism for rotatably supporting said second support roller;

an urging mechanism that urges said second support roller to be moved away from said first support roller;

a reference wall at a position closer to said second support roller than said reference protrusion such that said reference wall faces said reference protrusion; and a position at which said reference protrusion abuts against said reference wall is disposed apart from a virtual plane by a predetermined distance on the opposite side to a side where said first positioning mechanism is provided, said virtual plane being formed by connecting said first rotating axis of said first support roller and said second axis of said second support roller.

11. The image forming apparatus according to claim 10, wherein said reference protrusion is provided at a position closer to said first support roller than an intermediate position between said first and said second support rollers.

12. The image forming apparatus according to claim 11, wherein:

said second support roller is moveable along a second roller support plane formed on said second positioning mechanism; and said reference wall includes an orthogonal support plane that is substantially orthogonal to a moving direction of said second support roller, and said reference protrusion is positioned with respect to said moving direction by abutment of said orthogonal support plane against said reference protrusion.

13. The image forming apparatus according to claim 12, wherein:

said reference wall includes an inclined surface continued to said orthogonal support plane at a position apart from a virtual plane that is formed by connecting said first rotating axis of said first support roller and said second rotating axis of said second support roller farther than said orthogonal support plane; and said inclined surface is formed to be at an angle below 90° with respect to a plane parallel to said second roller support plane.

* * * * *